(12) United States Patent
Albulet et al.

(10) Patent No.: US 7,336,705 B2
(45) Date of Patent: Feb. 26, 2008

(54) SMART RECEIVER FOR WIRELESS PERIPHERALS

(75) Inventors: Mihai Albulet, Redmond, WA (US); Nathan C. Sherman, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 796 days.

(21) Appl. No.: 10/391,337

(22) Filed: Mar. 18, 2003

(65) Prior Publication Data
US 2004/0199829 A1 Oct. 7, 2004

(51) Int. Cl.
*H03K 9/08* (2006.01)
*H04B 17/00* (2006.01)

(52) U.S. Cl. .................... 375/238; 329/312; 455/226.2

(58) Field of Classification Search ............... 375/225, 375/227, 238, 239, 346, 348; 370/212, 213; 329/312, 313; 455/67.13, 226.1, 226.2
See application file for complete search history.

(56) References Cited

U.S. PATENT DOCUMENTS

| | | | |
|---|---|---|---|
| 4,908,771 A * | 3/1990 | Piot | 702/73 |
| 5,765,113 A * | 6/1998 | Russo et al. | 455/557 |
| 6,624,629 B1 * | 9/2003 | Speier et al. | 324/303 |
| 2003/0210662 A1 * | 11/2003 | Rensberger et al. | 370/328 |

FOREIGN PATENT DOCUMENTS

JP 411205245 A * 7/1999

* cited by examiner

*Primary Examiner*—Young T. Tse
(74) *Attorney, Agent, or Firm*—Banner & Witcoff, Ltd.

(57) ABSTRACT

Systems and methods for evaluating a signal containing pulses received from a wireless computer peripheral device are provided. A received signal is analyzed to measure the strength of the received signal and determine whether sources of interference exist. Correction action is recommended based on the analysis of the received signal.

19 Claims, 6 Drawing Sheets

# SMART RECEIVER FOR WIRELESS PERIPHERALS

BACKGROUND OF THE INVENTION

1. Field of the Invention

The present invention relates to the field of wireless computer peripheral devices. More particularly, the invention provides methods and devices for analyzing signal strength and interference and recommending corrective actions to a user.

2. Description of Related Art

Wireless computer peripheral devices, such as computer mice and keyboards, typically transmit data in packets modulated on a radio frequency (RF) carrier. There are generally a fixed number of channels available for use by wireless computer peripheral devices. Current computer configurations provide four channels. Two channels are allocated to a wireless mouse and the remaining two channels are allocated to a wireless keyboard.

The presence of nearby wireless computer peripheral devices can increase the rate of data loss by generating interference. For example, with only two channels allocated for mice, a computer lab or other cluster of computer devices may include several mice transmitting on the same channel. Data loss can result from factors such as insufficient signal strength, aborted packets, and receiving packets having the wrong identification or checksum value.

When an error condition exits, the cause of the error is generally not apparent to users. As a result, when faced with an error condition, users of wireless computer peripheral devices frequently contact service personnel or spend time attempting corrective steps that have a low probability of correcting the data loss problem.

Therefore, there exists a need in the art for systems and methods that analyze the sources of data losses incurred by wireless computer peripheral devices so that corrective action can be suggested to users.

BRIEF SUMMARY OF THE INVENTION

The present invention overcomes one or more of the limitations of the prior art by providing methods, systems and computer-executable components for analyzing the sources of data loss problems and providing corrective action suggestions to users. The signal strength of received packets is estimated or otherwise measured and potential interference is determined. Corrective action is recommended based on the signal strength and interference with received packets.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

Figure 1:
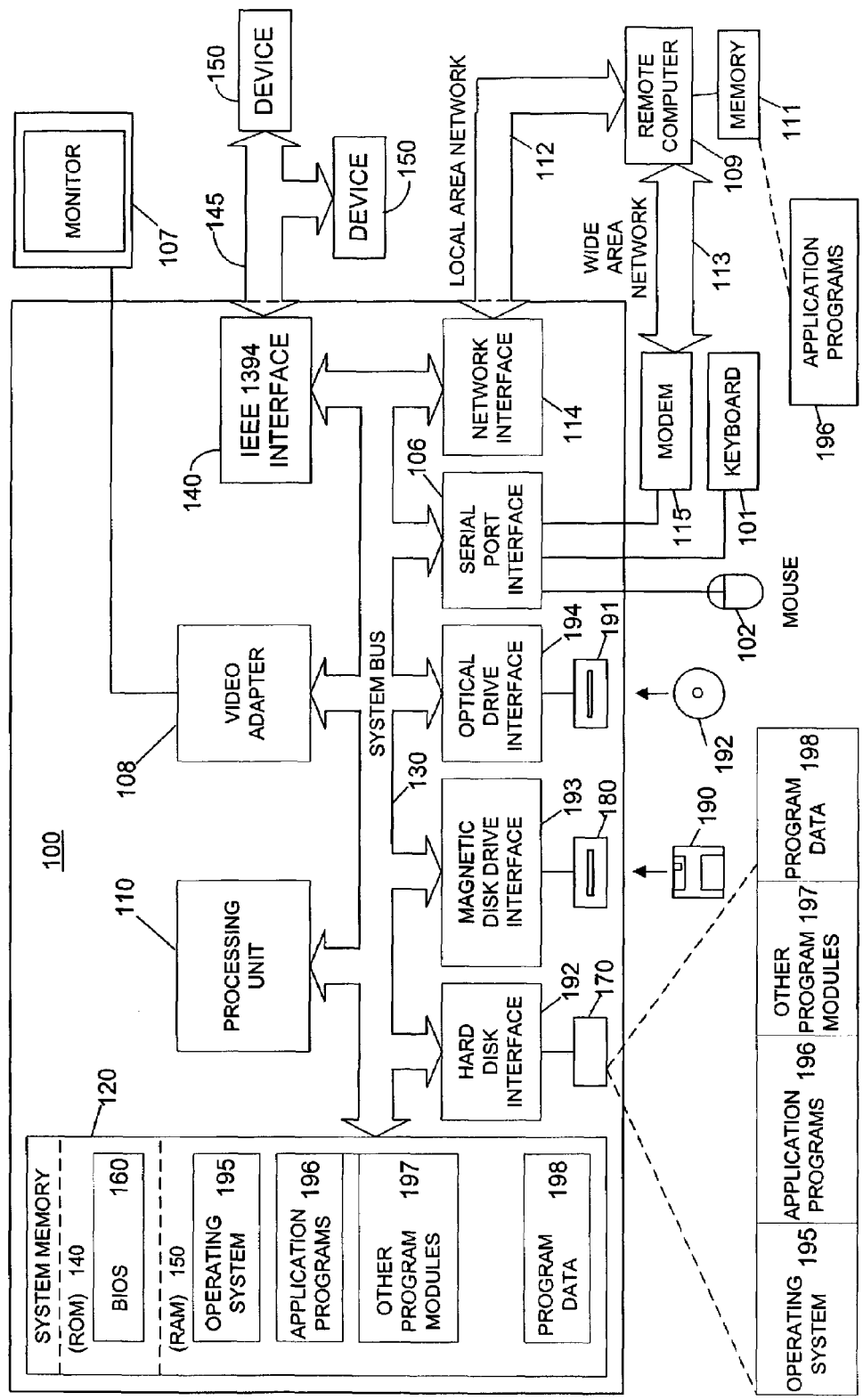
FIG. 1 is a block diagram of a general-purpose computer system capable of being used in conjunction with the present invention.

Aspects of the present invention may be implemented with computer devices and wireless computer peripheral devices. In particular, a computer device may be coupled to one or more wireless peripheral devices that transmit data via a radio frequency link. FIG. 1 is a schematic diagram of a conventional general-purpose digital computing environment that can be used to implement various aspects of the invention. Computer 100 includes a processing unit 110, a system memory 120 and a system bus 130 that couples various system components including the system memory to the processing unit 110. System bus 130 may be any of several types of bus structures including a memory bus or memory controller, a peripheral bus, and a local bus using any of a variety of bus architectures. System memory 120 includes a read only memory (ROM) 140 and a random access memory (RAM) 150.

A basic input/output system (BIOS) 160 containing the basic routines that help to transfer information between elements within the computer 100, such as during start up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. A user can enter commands and information into computer 100 through input devices, such as a keyboard 101 and a pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port, a universal serial bus (USB) or through a PCI board. A monitor 107 or other type of display device is also connected to system bus 130 via an interface, such as a video adapter 108. In addition to the monitor, personal computers typically include other peripheral output devices (not shown), such as speakers and printers.

Computer 100 can operate in a networked environment using logical connections to one or more remote computers, such as a remote computer 109. Remote computer 109 can be a server, a router, a network PC, a peer device or other common network node, and typically includes many or all of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, computer 100 is connected to local network 112 through a network interface or adapter 114. When used in a WAN networking environment, personal computer 100 typically includes a modem 115 or other means for establishing a communications over wide area network 113, such as the Internet. Modem 115, which may be internal or external, is connected to system bus 130 via serial port interface 106. In a networked environment, program modules depicted relative to personal computer 100, or portions thereof, may be stored in the remote memory storage device.

It will be appreciated that the network connections shown are exemplary and other ways of establishing a communications link between the computers can be used. The existence of any of various well-known protocols, such as TCP/IP, Ethernet, FTP, HTTP and the like, is presumed, and the system can be operated in a client-server configuration to permit a user to retrieve web pages from a web-based server. Any of various conventional web browsers can be used to display and manipulate data on web pages.

Although not required, the invention will be described in the general context of computer-executable instructions, such as program modules, that are executed by computer devices. Generally, program modules include routines, programs, objects, components, data structures, etc., that perform particular tasks or implement particular abstract data types.

Figure 2:
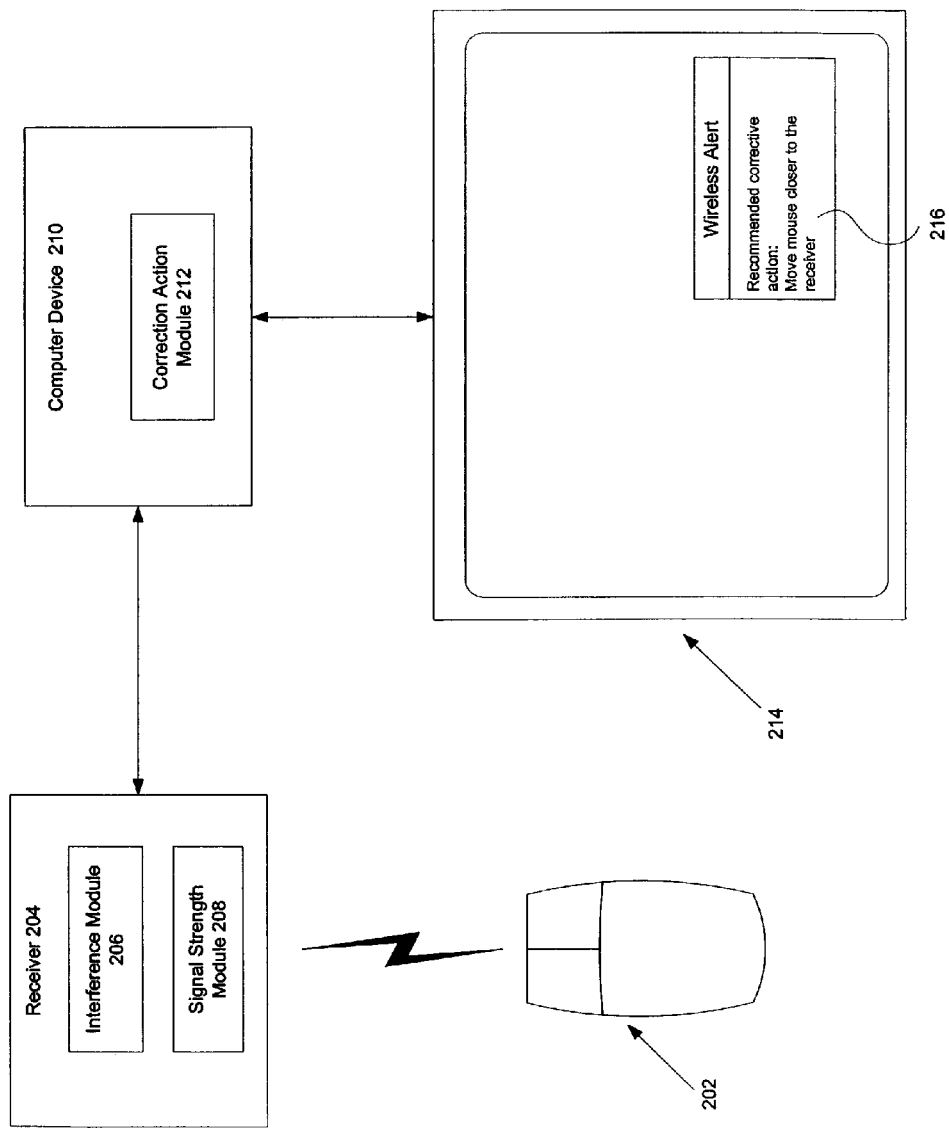
FIG. 2 illustrates a computer device configuration that includes a wireless peripheral device in accordance with an embodiment of the invention.

FIG. 2 illustrates a computer device configuration that includes a wireless computer peripheral device in accordance with an embodiment of the invention. A wireless computer mouse 202 may transmit radio frequency signals to receiver 204. Computer mouse 202 may operate at approximately 27 MHz with a bandwidth of about 50 KHz. In alternative embodiments of the invention, a different wireless computer peripheral device, such as a keyboard, may be used in place of mouse 202. Receiver 204 includes an interference module 206 that determines whether interference exists in the transmission of data from wireless computer mouse 202 to receiver 204. Receiver 204 also includes a signal strength module 208 that analyzes the strength of signals received at receiver 204. The operations of interference module 206 and signal strength module 208 are described in detail below.

Receiver 204 is connected to a computer device 210. Computer device 210 may be similar to computer 100 (shown in FIG. 1). Computer device 210 includes a corrective action module 212. Corrective active module 212 receives information from interference module 206 and signal strength module 208 and recommends corrective action to a user when there is a weak signal strength and/or interference.

Computer device 210 is also connected to a display device 214. Display device 214 may be similar to monitor 107 (shown in FIG. 1). Display device 214 displays a wireless alert 216 to a user of the system. In the example shown, wireless alert 216 recommends the corrective action of moving the mouse closer to the receiver. In one implementation wireless alert 216 is generated or selected by corrective actual action module 212 in the manner described below. Of course, aspects of the present invention may be implemented with other forms of conveying information to the user. For example, an audio or video message may be presented to the user.

One skilled in the art will appreciate that numerous modifications can be made to the system shown in FIG. 2 without departing from the broader spirit and scope of the invention. For example, corrective action module 212 may be included within receiver 204. Receiver 204 may include a display or group of lights to convey status and recommended corrective action information. For example, lights may be used to indicate signal strength and the presence of interference. In an alternative embodiment, one or more of interference module 206 and signal strength module 208 may be included within computer device 210. Of course, the functions of interference module 206, signal strength module 208 and collective action module 212 may be combined into one or more modules or further divided into additional modules. In one particular embodiment of the invention, interference module 206, signal strength module 208 and corrective action module 212 are implemented with computer-executable instructions residing within receiver 204 and/or computer device 210.

Figure 3:
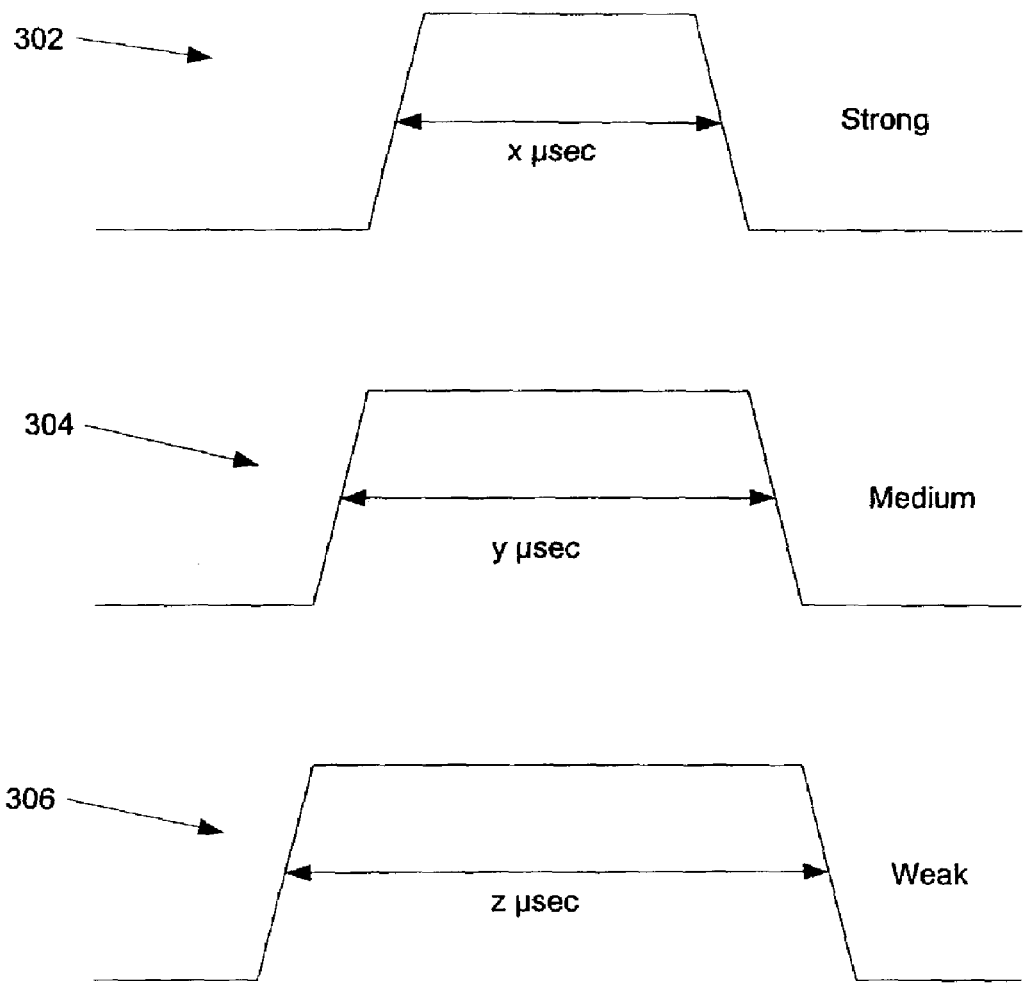
FIG. 3 illustrates a mechanism for analyzing signal strength in accordance with one embodiment of the invention.

FIG. 3 illustrates a mechanism for analyzing signal strength in accordance with one embodiment of the invention. Signals 302, 304 and 306 are exemplary signals that are received at a receiver, such as receiver 204. Signal 302 includes a pulse that has a pulse width of x microseconds. Signal 304 includes a pulse having a pulse width of y microseconds and signal 306 includes a pulse having a pulse width of z microseconds. As shown in the figure, y microseconds is longer than x microseconds and z microseconds is longer than y microseconds.

As a signal received at receiver becomes weaker, there is an increasing amount of jitter in the receiver signal. As a result, the deviation from the expected or optimal pulse width of the received signal can be used as an indication of the strength of the signal. Signal 302 is considered a strong signal because a pulse width of x microseconds falls within a predetermined tolerance of the original signal, such as plus or minus 10 microseconds of the original signal. Signal 304 is labeled as a medium signal because a pulse width of y microseconds exceeds the tolerance established for a strong signal, but does not exceed the minimum tolerance established for a weak signal. Signal 306 is labeled as a weak signal because the pulse width of z microseconds exceeds the minimum tolerance for a weak signal.

FIG. 3 shows pulse widths becoming longer as the signal strength becomes weaker. The pulse widths may also become shorter as the signal strength becomes weaker. The deviation from the optimal pulse width is used to determine signal strength. Signal strength module 208 may analyze a group of signals and use the signal having the greatest deviation from the optimal pulse width when making a signal strength determination. Aspects of the present invention are not limited to implementations that include wireless computer peripheral devices. In other embodiments, wireless telephones, PDAs or other devices and systems may analyze the strength of a received signal by measuring the deviation of a pulse from an optimal value. Moreover, signal strength module 208 may be configured to determine the signal strength of signals that do not use pulse width modulation.

Figure 4:
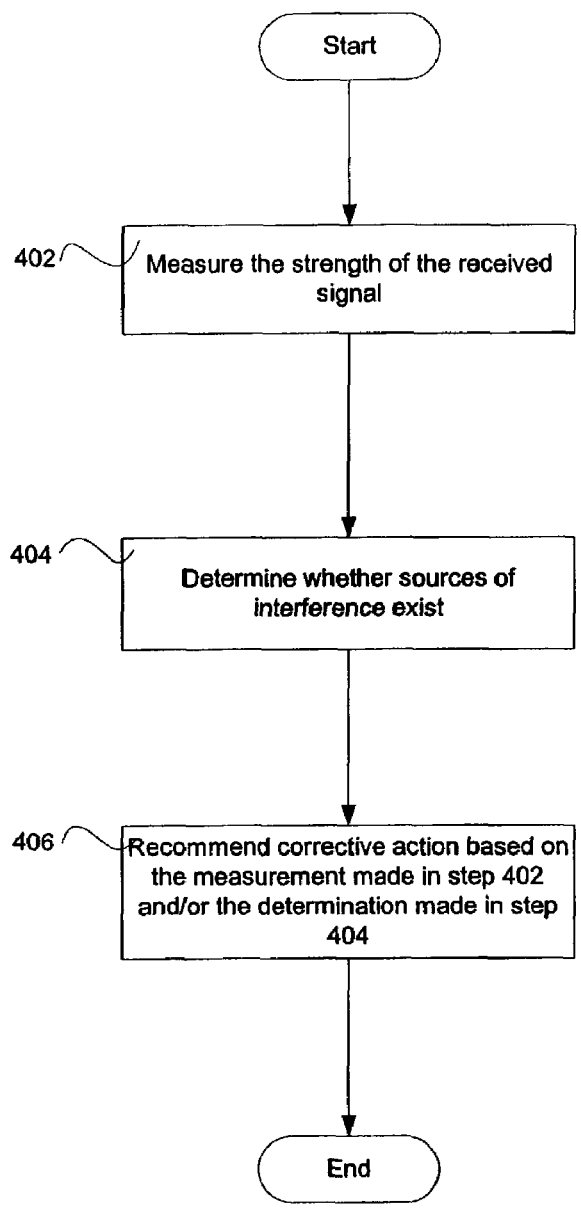
FIG. 4 illustrates a method for analyzing incoming signals and recommending corrective action in accordance with an embodiment of the invention.

FIG. 4 illustrates a method for analyzing incoming signals and recommending corrective action in accordance with an embodiment of the invention. First, in step 402 the strength of the received signal is measured. In one embodiment of the invention, step 402 includes analyzing the deviation of a pulse width from an optimal value. Next, in step 404 it is determined whether sources of interference exist. Step 404 may include identifying aborted packets, packets having incorrect checksums and/or identifying packets having invalid identifier values. Next, in step 406 corrective action is recommended based on the measurement made in step 402 and/or the determination made its step 404. Step 406 may include recommending that a user change the channel used to carry the signal, recommending that a user move a wireless computer peripheral device closer to the receiver and recommending that a user move the wireless computer peripheral device away from a potential source of interference.

After interference module 206 and signal strength module 208 determine and measure interference and signal strength, one skilled in the art will appreciate that there are many different methods that can be used by corrective action module 212 to recommend corrective action. Selection of the particular method may be a function of the type of computer device, wireless computer peripheral device, receiver or other factors.

Figure 5:
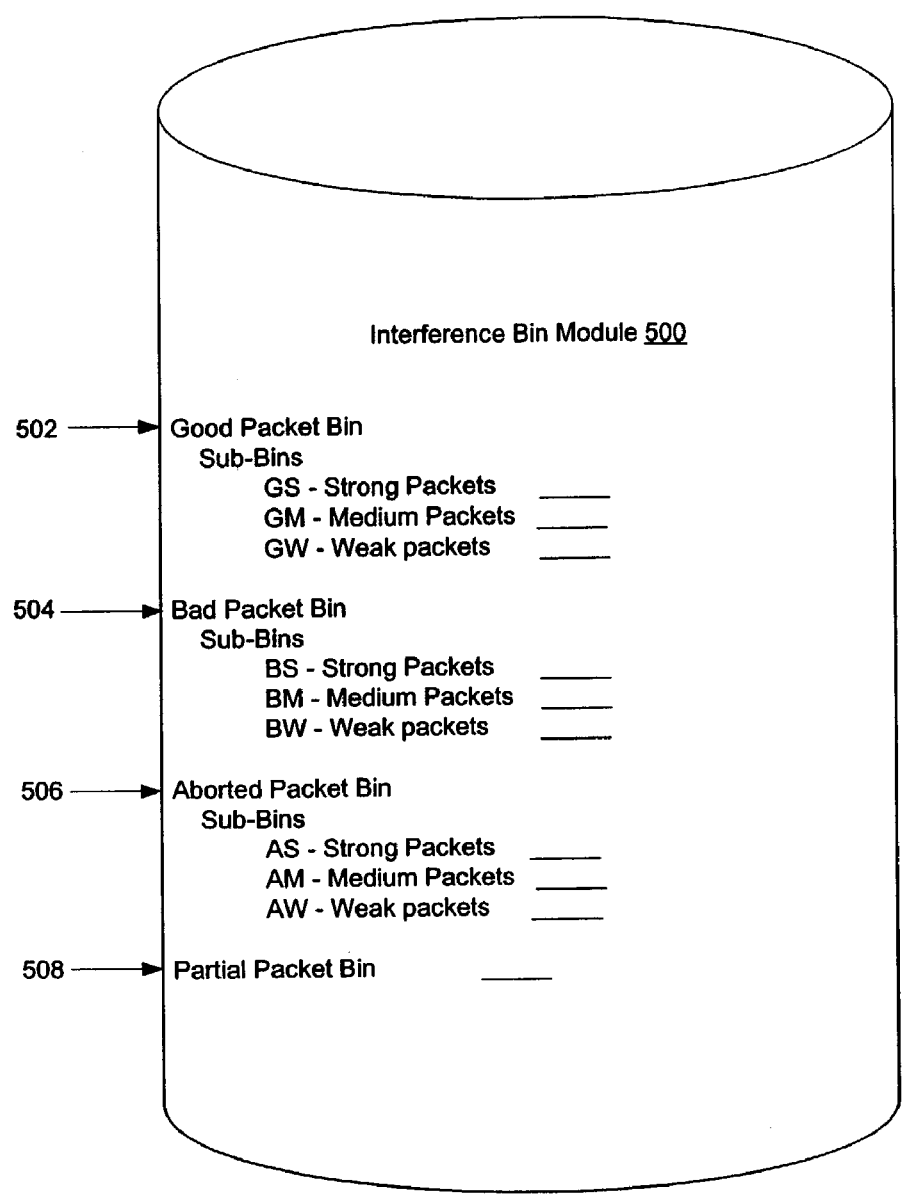
FIG. 5 illustrates an interference bin module that may be used to store interference and signal strength information, in accordance with one embodiment of the invention.

FIG. 5 illustrates an interference bin module 500 that may be used to store interference and signal strength information for use by corrective action module 212. Interference bin module 500 may be included within receiver 204 or computer device 210. A good packet bin 502 includes a count of packets having good checksums. A bad packet bin 504 includes a count of packets having bad checksums or identifier values. An aborted packet bin 506 includes a count of packets that were aborted. The values within bins 502, 504 and 506 are divided into strong packet, medium packet and weak packet sub-bins. A sub-bin is selected based on the signal strength of the packet. For example, a good packet having a medium signal strength would be counted under good packet bin 502 in the medium packets sub-bin. A partial packet bin 508 may be included to count partial packets.

Figure 6:
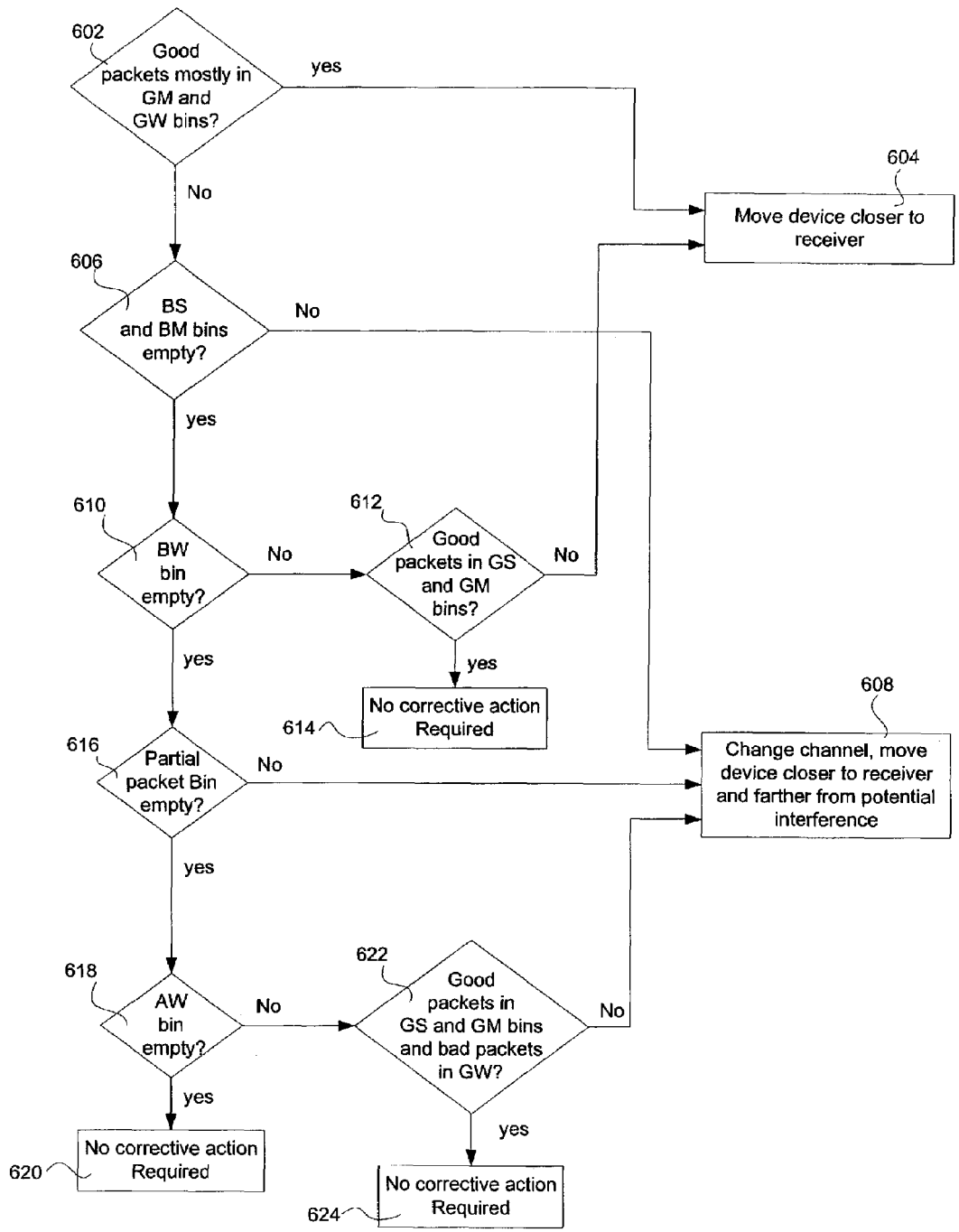
FIG. 6 shows a method that may be used by a corrective action module to provide corrective action based on the information in an interference bin module, in accordance with one embodiment of the invention.

FIG. 6 shows a method that may be used by a corrective action module to provide corrective action based on the information in an interference bin module. First, in step 602 is determined whether good packets are mostly counted in the medium and weak sub-bins of good packet bin 502. When they are, in step 604 the corrective action of moving the device closer to the receiver is recommended. Next, in step 606 it is determined whether the strong and medium sub-bins of bad packet bin are empty. When they are not, the corrective actions of changing the channel, moving the device closer to the receiver and moving the device farther from potential interference are recommended in step 608.

In step 610 it is determined whether the weak sub-bin of bad packet bin 504 is empty. When the sub-bin is not empty, in step 612 it is determined whether good packets are in the medium and strong sub-bins of good packet bin 502. When they are not, in step 604 the corrective action of moving the device closer to the receiver is recommended. When good packets are in the medium and strong sub-bins of good packet bin 502, in step 614 no corrective action is required.

Next, in step 616 it is determined whether partial packet bin 508 is empty. When it is not, the corrective actions of changing the channel, moving the device closer to the receiver and moving the device farther from potential interference are recommended in step 608. In step 618 it is determined whether the weak sub-bin of aborted packet bin 506 is empty. When it is empty, in step 620 no corrective action is required. When the sub-bin is not empty, in step 622 it is determined whether good packets are in the medium and strong sub-bins of good packet bin 502 and bad packets are in the weak sub-bin of good packet bin 502. When they are not, the corrective actions of changing the channel, moving the device closer to the receiver and moving the device farther from potential interference are recommended in step 608. When good packets are in the medium and strong sub-bins of good packet bin 502 and bad packets are in the weak sub-bin of good packet bin 502, in step 624 no corrective action is required.

The present invention has been described herein with reference to specific exemplary embodiments thereof. It will be apparent to those skilled in the art, that a person understanding this invention may conceive of changes or other embodiments or variations, which utilize the principles of this invention without departing from the broader spirit and scope of the invention as set forth in the appended claims. For example, when the wireless computer peripheral device is configured to receive data, the wireless computer peripheral device may be configured to receive and implement corrective action information. All changes or other embodiments or variations, which utilize the principles of this invention are considered within the sphere, spirit, and scope of the invention. The specification and drawings are, therefore, to be regarded in an illustrative rather than restrictive sense. Accordingly, it is not intended that the invention be limited except as may be necessary in view of the appended claims.

We claim:

1. A method of analyzing a signal strength of a received signal containing pulses, the method comprising:
    (a) measuring a pulse width of one of the pulses;
    (b) determining a difference between an optimal pulse width and the measured pulse width; and
    (c) determining that the received signal is below a first predetermined threshold when an absolute value of the difference is greater than a first predetermined amount.

2. The method of claim 1, wherein said one of the pulses corresponds to a pulse in a group of pulses having the greatest deviation from an optimal value.

3. The method of claim 1, wherein (a) comprises determining whether the measured pulse width is within a predetermined range.

4. The method of claim 1, wherein the received signal is received from a wireless computer peripheral device.

5. The method of claim 1, further comprising:
    (d) determining that the signal strength is greater than a second predetermined threshold when the absolute value of the difference is less than a second predetermined amount.

6. A method of evaluating a signal containing pulses received from a wireless computer peripheral device, the method comprising:
    (a) measuring a strength of a received signal by:
        (i) measuring a pulse width of one of the pulses;
        (ii) determining the difference between an optimal pulse width and the measured pulse width; and (iii) determining the strength of the received signal from an absolute value of the difference;

(b) determining whether sources of interference exist; and (c) recommending corrective action based on the measurement made in (a) and the determination made in (b).

7. The method of claim 6, wherein (b) comprises identifying aborted packets.

8. The method of claim 6, wherein (b) comprises identifying packets having incorrect checksums.

9. The method of claim 6, wherein (b) comprises identifying packets having invalid identifier values.

10. The method of claim 6, wherein (c) comprises recommending that a user changes a channel used to carry the signal.

11. The method of claim 6, wherein (c) comprises recommending that a user moves the wireless computer peripheral device closer to a receiver.

12. The method of claim 6, wherein (c) comprises recommending that a user moves the wireless computer peripheral device away from a potential source of interference.

13. The method of claim 6, wherein the wireless computer peripheral device comprises a computer mouse.

14. The method of claim 6, wherein the wireless computer peripheral device comprises a computer keyboard.

15. The method of claim 6, wherein (c) comprises displaying a message on a display device.

16. A computer system comprising:

a receiver that is coupled to a computer device and that receives signals from a wireless computer peripheral device;

a signal strength module that determines a signal strength of signals transmitted from the wireless computer peripheral device to the receiver based on an absolute pulse difference, the absolute pulse difference being determined by:

measuring a measured pulse width;

subtracting the measured pulse width from an optimal pulse width to obtain a pulse difference; and determining an absolute value of the pulse difference;

an interference module that determines whether sources of interference interfere with the signals; and a corrective action module that recommends corrective action based on information received from the signal strength module and the interference module.

17. The computer system of claim 16, wherein the signal strength module determines the signal strength as a function of at least one pulse width of a pulse that is included in the signals received from the wireless computer peripheral device.

18. The computer system of claim 16, wherein the signal strength module and the interference module are included in the receiver.

19. A computer-readable medium containing computer-executable instructions for causing a computer device receiving a signal containing pulses from a wireless computer peripheral device to perform the steps comprising:

(a) measuring a strength of a received signal by:

(i) measuring a pulse width of one of the pulses;

(ii) determining the difference between an optimal pulse width and the measured pulse width; and (iii) determining the strength of the received signal from an absolute value of the difference;

(b) determining whether sources of interference exist; and (c) recommending corrective action based on the measurement made in (a) and the determination made in (b).

* * * * *